Figure 1:
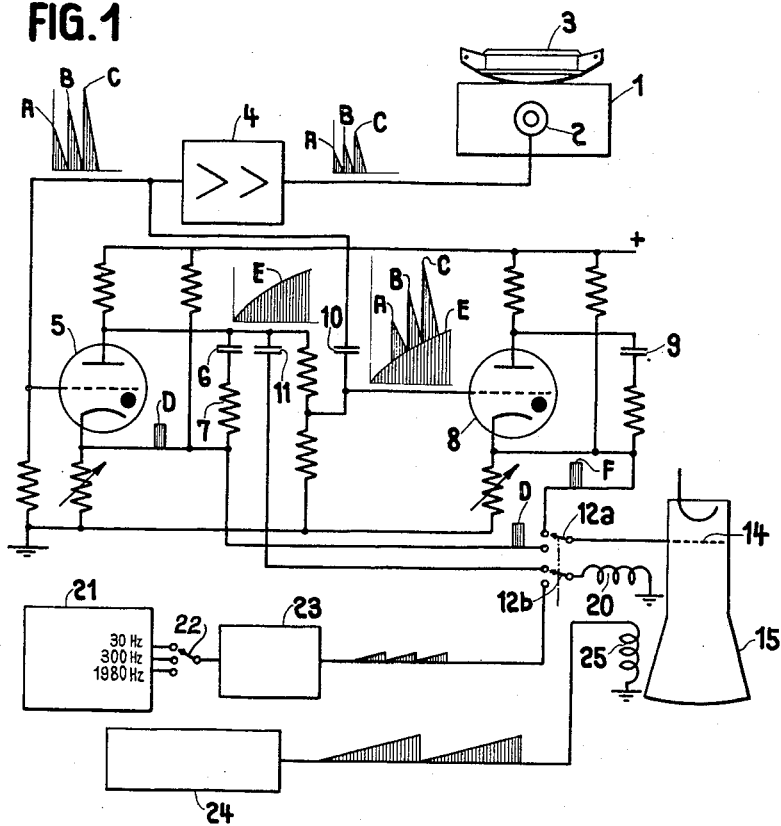

Oct. 3, 1961

A. BORER 3,002,371

APPARATUS FOR TESTING THE OSCILLATING
PROPERTIES OF THE BALANCE WHEEL OF
A WATCH OR CLOCK

Filed June 9, 1959

INVENTOR
Anton Borer
BY
*Imirie & Smiley*
ATTORNEYS

United States Patent Office 3,002,371
Patented Oct. 3, 1961

3,002,371
APPARATUS FOR TESTING THE OSCILLATING PROPERTIES OF THE BALANCE WHEEL OF A WATCH OR CLOCK
Anton Borer, Riedholz, Switzerland
Filed June 9, 1959, Ser. No. 819,054
Claims priority, application Switzerland June 18, 1958
6 Claims. (Cl. 73—6)

This invention relates to a method and apparatus for testing and indication of the oscillating properties of the balance wheel of a watch or clock. For testing completed watches and clocks methods and apparatus are required allowing rapid indication of the oscillating properties, particularly of the frequency and of the amplitude of the balance wheel. Apparatus of this kind are known allowing each indication of only one of the above characteristic elements of the balance-wheel oscillation. For proper analysis of the oscillating properties it is usually required to compare the behavior of the balance wheel during several consecutive cycles of its oscillation in order to determine whether the frequency or amplitude of the balance wheel is regular or irregular. Complicated apparatus having mechanical instruments for writing the results of consecutive measurements onto a paper strip continuously fed through the apparatus have been developed for this purpose. However, such apparatus are very expensive in construction and particularly in use due to the great waste of paper.

It is the object of this invention to provide a method and apparatus for continuously observable diagrammatic indication of the results of a number of consecutive measurements without any waste of paper. It is a further particular object of this invention to allow indication of the balance-wheel frequency and amplitude with substantially the same means. This invention broadly comprises providing a cathode ray tube having a screen providing a luminous trace of high permanence, repeatedly controlling the electron beam of the said cathode ray tube in accordance with the oscillating properties of the balance wheel for consecutive cycles of the balance-wheel oscillation, thereby forming a permanent complete diagram of luminous traces on the said screen, and the high permanence of the traces allowing observation and evaluation of the complete persistent diagram. An electron ray tube may be used having a high persistence or decay-time of the fluorescent screen in the order of at least 30 seconds, or a so called "Skiatron" may preferably be used having a screen allowing tracing persistent for hours by changing the screen color, it being possible to immediately extinguish the tracing for producing another tracing. By these means the use of a paper strip and a mechanical writing system associated therewith is completely avoided. Since the apparatus may be adapted for fully electronic operation it is not subject to limitations due to mechanical inertia of a writing system and therefore the sensitivity of the system may be much higher than it was possible with known devices.

Figure 2:
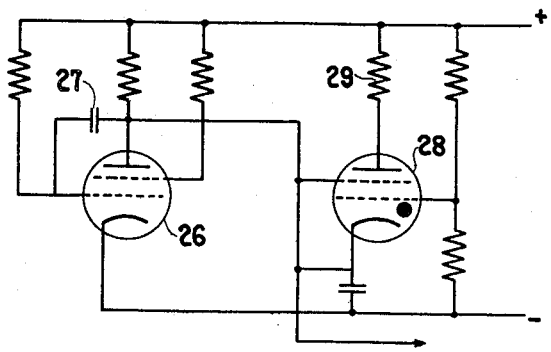

One embodiment of the invention is illustrated by way of example in the attached drawing wherein:

FIG. 1 is a complete diagram of the apparatus, and
FIG. 2 is a detailed diagram of a part of the apparatus.

The apparatus has a detecting unit 1 comprising a microphone 2 whereon a completed watch 3 may be laid for testing. During each passage of the balance wheel of the watch through its zero or equilibrium position the three well known characteristic noise pulses A, B and C are received by the microphone 2 and transmitted to an amplifier 4, the so amplified pulses being fed from the output of amplifier 4 to the control grid of a thyratron 5. A positive bias potential is produced on the cathode of the thyratron 5 by means of a voltage divider so that the thyratron is normally cut off. The bias potential is so adjusted that the thyratron immediately becomes conducting on arrival of the first pulse A. A condenser 6 and a small limiting resistor 7 are series connected between the anode and cathode of the thyratron 5. When the thyratron becomes conducting on arrival of the first pulse A as mentioned above, the condenser 6 is rapidly discharged through the thyratron whereby the anode voltage rapidly decreases below the potential required for further discharge through the thyratron so that the thyratron soon returns to its initial non-conducting condition. During discharge through the thyratron 5 a positive voltage pulse D is produced at the cathode resistor of the thyratron, this pulse D being fed to the one contact of a commutator 12a. After extinction of the thyratron 5 in the manner set out above, the condenser 6 is recharged relatively slowly through the anode resistor of the thyratron 5 so that a voltage of substantially saw tooth shape is produced at the anode of thyratron 5, this voltage decreasing suddenly on arrival of the first pulse A and increasing subsequently as indicated by diagram E in FIG. 1. The voltage rise E is transmitted through a voltage divider to the control grid of a further thyratron 8, the circut of thyratron 8 being similar to the circuit of thyratron 5. A condenser 9 and a limiting resistor are series connected between the anode and cathode of thyratron 8. By means of a condenser 10 the control grid of thyratron 8 is directly connected to the output of amplifier 4. The commutator 12 has a second segment 12b, the anode of thyratron 5 being connected to one of the contacts of segment 12b by means of a coupling condenser 11.

It is easily recognized that the superposition of the voltage pulses A, B and C with the increasing voltage E appears at the control grid of thyratron 8, as indicated by a diagram in FIG. 1. By means of a voltage divider the bias potential of the cathode of thyratron 8 is so adjusted that the thyratron 8 is usually cut off and only becomes conducting due to the peak voltage occurring on arrival of the last pulse C. Once the thyratron 8 is ignited in this way, substantially the same operation occurs as set out above in connection with thyratron 5 so that a positive pulse F is produced at the cathode of the thyratron 8 on arrival of the noise pulse C, this positive pulse F being transmitted to the upper contact of commutator segment 12a which is connected to the control grid 14 of a cathode ray tube 15. Thyratron 8 thus forms a threshold circuit of which the threshold potential continuously decreases due to the increasing component E of the grid voltage, the threshold potential being so adjusted, that it is exceeded by the third pulse C only.

The lower contact 12b of the commutator 12 is connected to the horizontal deflecting coil 20 of the cathode ray tube 15.

The apparatus further comprises a crystal-controlled or otherwise stabilized standard or gauge oscillator 21 having a frequency divider allowing selection of different stable standard output frequencies, such as 30, 300 and 1980 c./s. One of these frequencies is fed through a commutator 22 to the input of a saw-tooth generator 23 of well known design which is synchronized by the stabilized frequency produced in oscillator 21. The output of saw-tooth generator 23 is connected to the lower contact of commutator 12b.

The apparatus is also equipped with a saw-tooth oscillator 24 operating at a very low frequency, this oscillator being continuously connected to the vertical deflecting coil 25 of the cathode ray tube 15. A suitable D.C. amplifier may be interconnected between the oscillator 24 and the deflecting coil 25. One preferred embodiment of the saw-tooth oscillator 24 is shown in FIG. 2. This oscillator has a tube 26 and a relatively large condenser 27 connected between the anode and the control grid of this tube, this condenser being usually discharged relatively slowly and practically linearly through tube 26. During discharge of condenser 27 the potential at the anode of tube 26 slowly decreases so that the potential at the cathode of a gas discharge tube or thyratron 28 decreases accordingly. The control grid of tube 28 is maintained at a constant potential by means of a fixed voltage divider. The anode of tube 28 is connected to the positive terminal of a battery through a small current-limiting resistor 29 in the order of 50 ohms.

During the said gradual potential decrease at the anode of tube 26 and at the cathode of tube 28 respectively, tube 28 will suddenly become conducting when the potential has decreased to a predetermined value, whereby the condenser 27 is suddenly completely recharged through resistor 29 and tube 28. In this manner a low frequency saw-tooth voltage having very steep front flanges and flat back flanges is produced which is transmitted to the vertical deflecting coil of the cathode ray tube.

Operation of the apparatus is as follows:

With the commutator 12 in the position illustrated in FIG. 1 the apparatus may be used for testing the amplitude of the balance wheel. As mentioned above a current according to diagram E flows in the horizontal deflecting coil of the cathode ray tube 15 on arrival of each pulse A. Further, a short pulse F is fed to the control grid 14 of the cathode ray tube 15 on arrival of each third pulse C whereby the usually suppressed electron beam is released or set up for the duration of pulse F so that a luminous spot or a spot-like change in color will appear on the screen of tube 15. The position in horizontal direction of this spot depends on the time interval between occurrence of pulses A and C, or more exactly on the momentary value of the deflecting current in coil 20 on arrival of pulse C. Since this deflecting current increases in accordance with a function E from the instant of pulse A it is evident that the spot appears in a horizontal position depending on the time interval between pulses A and C, and since this time interval is itself in a predetermined relation with the amplitude of the balance wheel, the position of the spot allows determination of the actual amplitude of the balance wheel.

However, the electron beam is not only deflected in horizontal direction as mentioned above but also in vertical direction, whereby the frequency of saw-tooth oscillator 24 is much lower than the oscillating frequency of the balance wheel, so that the electron beam is repeatedly deflected horizontally as mentioned above during several successive cycles of the balance-wheel oscillation while the beam is slowly deflected in vertical direction. One luminous or colored spot will be produced for each horizontal deflection of the beam and such spots will be vertically shifted from each other due to the slow vertical displacement of the beam. When it is a question of deflecting the beam, it is always understood that the beam would gradually be deflected when effective and that this deflection is equally effective in the very moment for which the electron beam is released. When the spots produced in the manner set out above and vertically spaced from each other appear in a strictly vertical line this means that the amplitude of the balance wheel is constant. If, however, succeeding spots are horizontally shifted this indicates a variation in balance-wheel amplitude. Further the mean horizontal position of the spots on the screen of the electron ray tube allows evaluation of the absolute and mean value of the amplitude.

When the commutator 12 is changed to its lower position, the horizontal deflecting coil 20 is connected to the saw-tooth oscillator 23 so that an always effective electron beam would be periodically deflected linearly. The vertical deflecting coil 25 is connected to the still effective low frequency saw-tooth oscillator 24. The control grid of the electron ray tube is connected to the cathode of thyratron 5. During every passage of the balance wheel through its zero or equilibrium position a short pulse D is applied to the control grid 14 of the cathode ray tube 15 through switch 12a, whereby the electron beam is released or set up pulsewise for producing a luminous or colored spot as set out above. The horizontal position of the spot depends on the phase relationship between the saw-tooth pulses produced by generator 23 and the pulses D. Therefore, the spot will appear on the left or on the right of the screen of the cathode ray tube according to whether the pulse D occurs at the beginning or at the end of a pulse produced by the saw-tooth generator 23. Since a slow vertical displacement of the spots is simultaneously effected a two dimensional diagram of vertically displaced spots will again be obtained. When the balance-wheel oscillates in absolute synchronism with the stabilized standard oscillator 21 and the generator 23 controlled by oscillator 21 respectively, the spots will appear in a strictly vertical row, this indicating correct adjustment of the balance-wheel frequency. On the other hand, any inclination of the row of vertically spaced spots of the diagram appearing on the screen indicates a difference in frequency of the balance wheel and of the gauge oscillator 21 respectively, the deviation from the vertical direction being a measure of the magnitude of the deviation from the correct adjustment of the balance-wheel frequency. By means of this indication the watch may rapidly and easily be adjusted.

The measuring sensitivity may be adjusted as desired by proper choice of different frequencies on the standard oscillator 21. A frequency of 30 c./s. is used for testing normal quality watches, whereas a higher frequency of 300 or 1980 c./s. is used for testing high precision watches such as chronometers, electrically controlled watches or clocks or the like. With higher frequencies from the gauge oscillator even very small deviations from the correct frequency of the balance wheel will rapidly result in a substantial phase drift between the oscillator frequency and the balance-wheel frequency so that an appreciable inclination of the said row of spots is obtained.

Of course details of the apparatus may be changed or replaced by similar elements. As an example the pulsewise control of the electron beam in the cathode ray tube may be omitted because it would be sufficient to suppress the beam in the desired instant. In this case the reference points of the diagram produced on the screen would be formed by the ends of luminous or colored lines. Such an apparatus may be used for testing contact-controlled electric watches or clocks whereby horizontal deflection of the electron beam would be initiated at the beginning of the closure of the watch contact and the electron beam would be set up during the contact closure. Therefore, the length of the luminous lines appearing on the screen is a measure for the contact-closing time. Since this time itself depends on the amplitude of the balance wheel the length of the lines is a measure for this amplitude. For testing the frequency of the balance wheel the contact pulses of an electric watch may be applied directly to the control grid 14 of the cathode ray tube for release of the electron beam during the contact closing time, while the horizontal deflecting coil 20 is fed in the manner set out above from the saw-tooth generator 23. It is evident, that in this case an indication of the amplitude and of the frequency of the balance wheel is simultaneously obtained, the length of the lines appearing on the screen being a measure for the balance-wheel amplitude and any horizontal shift of succeeding lines indicating a deviation of the balance-wheel frequency from the prescribed value. On the other hand, the contact pulses might be shortened by well known electronic means in order to obtain sharp spots instead of lines on the screen of the cathode ray tube.

Of course it would as well be possible to electronically produce a pulse of a length equal to the time interval between the first and third noise pulses A and C and to set up the electron beam in the cathode ray tube during this pulse. By this means a luminous or colored line would be produced on the screen providing simultaneous indication of the amplitude and frequency of the balance wheel. Phase-shifting means may be interconnected between the standard oscillator 21 and the horizontal deflecting coil of the cathode ray tube in order to allow immediate adjustment of a suitable initial phase relation between the deflecting signal and the signals derived from the balance-wheel oscillation.

The apparatus might also be simplified by omitting the vertical deflection of the electron beam. One single stationary luminous spot on the screen would indicate constant amplitude and correct frequency respectively of the balance wheel, whereas a row of horizontally spaced spots would indicate variations of the amplitude and a deviation from the correct frequency respectively.

What I claim is:

1. An apparatus for testing and indicating the oscillating properties of the balance wheel of a watch or clock, comprising a cathode ray tube having means controllable for producing an electron beam, a screen providing for high permanence of traces produced thereon by impact of the electron beam and deflecting means for deflection of the electron beam, microphone means for detecting three characteristic noise pulses emitted by the watch or clock during every passage of the balance wheel through its zero or equilibrium position, first means operatively associated with the said microphone means for producing a deflecting signal upon occurrence of the first of the said three noise pulses, and second means for producing a deflecting signal in synchronism with a highly stable standard frequency, commutator means having a first and second position for selective connection of the said first and second means respectively for producing a deflecting signal to the said deflecting means for deflection of the electron beam, first and second control means selectively connected to the said means for producing an electron beam for the said first and second position respectively of the said commutator means, the said means for producing an electron beam being controllable for producing an electron beam by the said first and second control means on occurrence of the first or the last respectively of the said noise pulses.

2. An apparatus according to claim 1, the said second control means comprising a threshold circuit, means for continuously decreasing the threshold potential of the said circuit after occurrence of the said first noise pulse, and the threshold potential of the said circuit adjusted to be exceeded on occurrence of the third of said noise pulses.

3. An apparatus according to claim 2, comprising means for applying a voltage continuously increasing after occurrence of the first noise pulse to the said threshold circuit in order to continuously increase the sensitivity of the circuit.

4. An apparatus according to claim 1, comprising a standard oscillator for producing the said highly stable standard frequency, means for varying the said standard frequency and consequently the sensitivity of the apparatus.

5. An apparatus for testing and indicating the oscillating properties of the balance wheel of a watch or clock, comprising microphone means for detecting three characteristic noise pulses emitted by the watch or clock during every passage of the balance wheel through its zero or equilibrium position, a standard frequency oscillator, a cathode ray tube having means for producing an electron beam, means for selectively controlling the electron beam of the said cathode ray tube in synchronism with the said first and third noise pulses and with the said standard frequency respectively, selector means having a first position providing for control of the electron beam by one of the said noise pulses and the standard frequency respectively for indicating the balance-wheel frequency, and a second position of the said selector means providing for control of the electron beam by the said first and third noise pulses respectively, for indicating the amplitude of the balance wheel.

6. An apparatus for testing and indicating the oscillating properties of the balance wheel of a timepiece, comprising means for detecting phenomenons characteristic of the oscillation of the balance wheel, first means for periodically producing a value characteristic of the amplitude of the balance wheel and second means for periodically producing a value characteristic of the frequency of the balance wheel, a standard oscillator producing a standard frequency, a cathode ray tube having deflecting means for deflecting its electron beam and control means for controlling the intensity of the electron beam, and means for selectively connecting the said standard oscillator to the said deflecting means and the said second means to the said control means of the cathode ray tube for producing an indication on the balance-wheel frequency or for connecting the said first and second means to the control means and deflecting means respectively of the cathode ray tube for producing an indication on the balance-wheel amplitude.

References Cited in the file of this patent

UNITED STATES PATENTS

| | | |
|---|---|---|
| 2,473,700 | Berkley | June 21, 1949 |
| 2,544,482 | Barnes | Mar. 6, 1951 |
| 2,608,093 | Traver | Aug. 26, 1952 |
| 2,782,627 | Hetzel | Feb. 26, 1957 |
| 2,859,341 | Goldsmith | Nov. 4, 1958 |

FOREIGN PATENTS

| | | |
|---|---|---|
| 817,870 | Germany | Oct. 22, 1951 |
| 1,052,092 | France | Sept. 23, 1953 |